Nov. 25, 1969 W. M. HUBBARD 3,480,869
TIMING RECOVERY CIRCUIT FOR USE IN FREQUENCY-MODULATED, DIFFERENTIALLY COHERENT PHASE MODULATION (FM-DPM) COMMUNICATION SYSTEM
Filed Dec. 27, 1966 2 Sheets-Sheet 1
FIG. 1
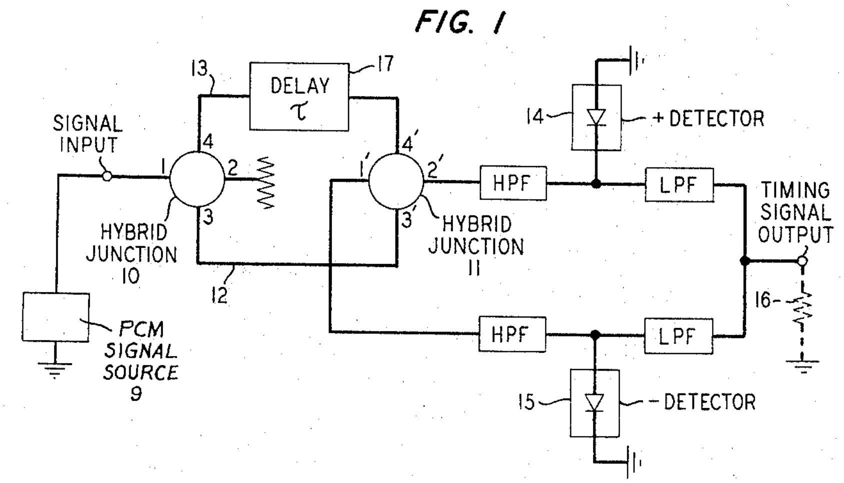
FIG. 2
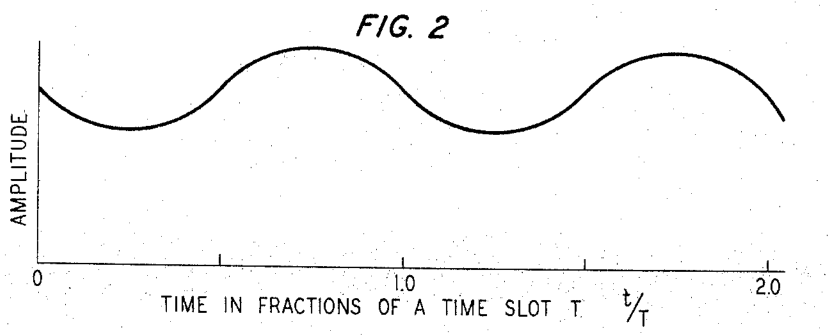
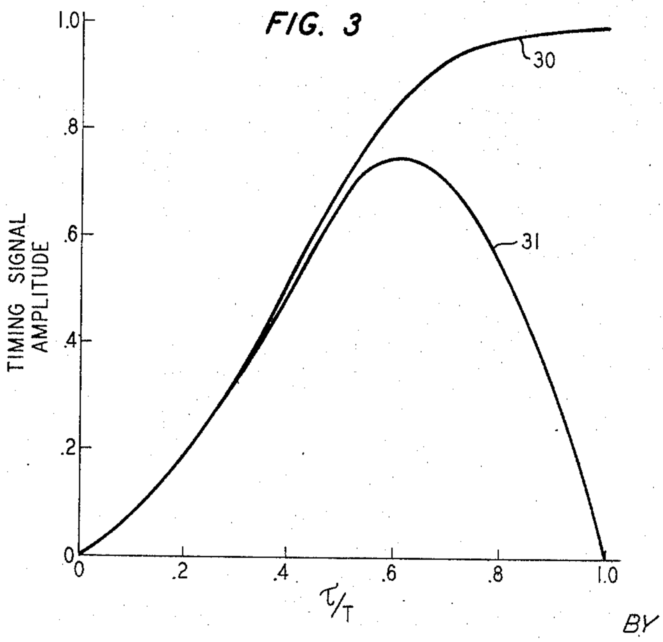
INVENTOR
W. M. HUBBARD
BY
Sylvan Sherman
ATTORNEY

1

3,480,869

TIMING RECOVERY CIRCUIT FOR USE IN FREQUENCY-MODULATED, DIFFERENTIALLY COHERENT PHASE MODULATION (FM-DPM) COMMUNICATION SYSTEM

William M. Hubbard, Middletown Township, Monmouth County, N.J., assignor to Bell Telephone Laboratories, Incorporated, Murray Hill and Berkeley Heights, N.J., a corporation of New York Filed Dec. 27, 1966, Ser. No. 604,924

Int. Cl. H03d 3/00

U.S. Cl. 329—112 6 Claims

ABSTRACT OF THE DISCLOSURE

A circuit for extracting timing information directly from an FM-DPM pulse code modulated signal. The signal is divided into two equal components which are delayed relative to each other a fraction of a time slot and then recombined in the sum and difference branches of a hybrid junction. The two signals thus produced are amplitude-detected in oppositely-poled detectors and the outputs combined in a common load. The timing information is shown to be independent of signal content.

Figure 4:
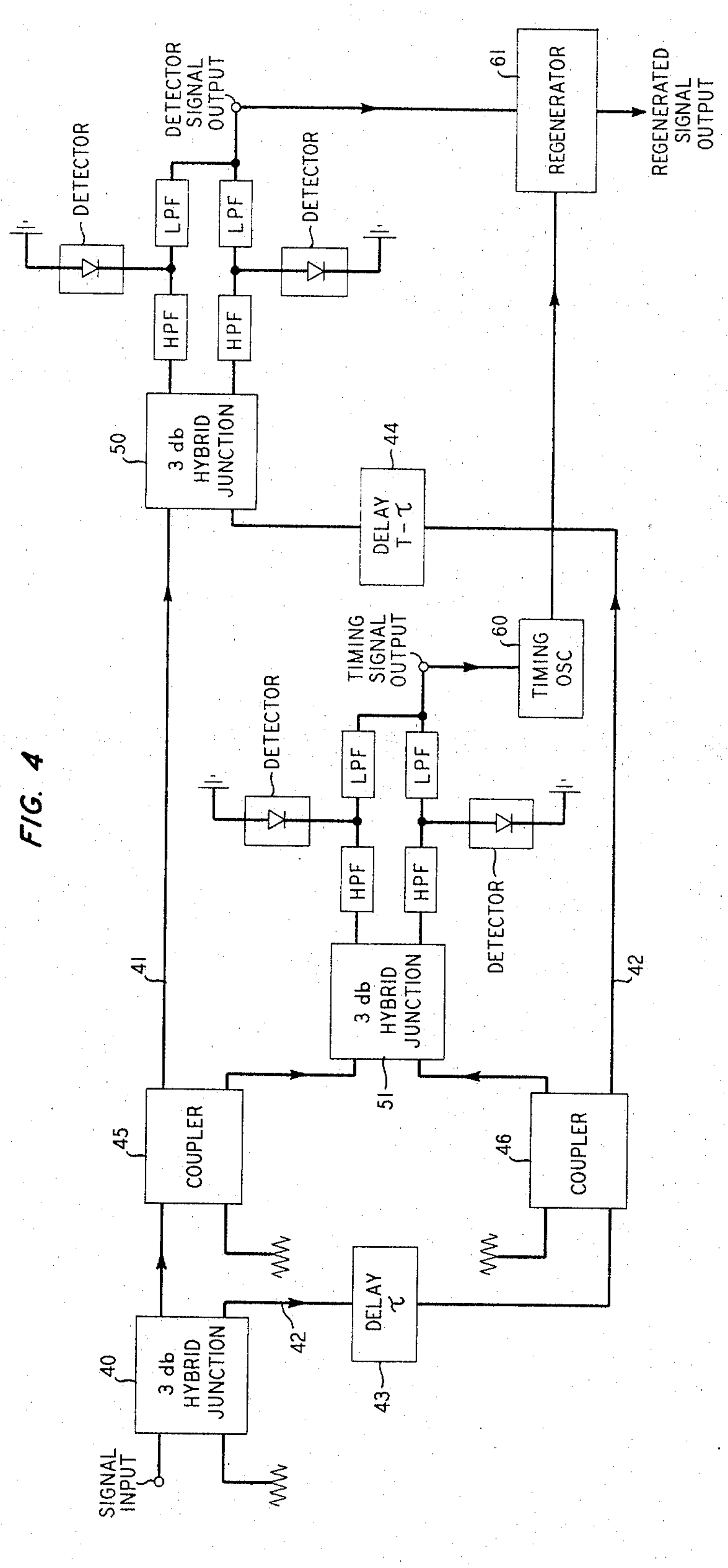

This invention relates to timing recovery arrangements for use in an FM-differentially coherent phase modulation (FM-DPM) communications system.

In the copending application by W. D. Warters, Ser. No. 568,893, filed July 29, 1966, there is described an FM-differentially coherent phase modulation communication system wherein the information is encoded upon the phase of a high frequency signal. In this type of system, the signal has constant amplitude and is angle-modulated in such a way that the information is carried in the relative phase shift between sampling instants. The information, so encoded, is then recovered by comparing the relative phase of the signals in two adjacent time slots.

However, in order for the recovery process to accurately reproduce the original signal, it is necessary for the receiver to sample the received signal at precisely the correct time in each time slot. In order to do this, the receiver must be provided with timing information that is synchronous with the clock of the transmitter.

One obvious way of obtaining timing information is to provide a separate channel between the transmitter and the receiver for the transmission of the necessary timing information. A much more attractive alternative is to extract the timing information directly from the signal itself. The present invention relates to an arrangement for extracting timing information directly from an FM-differentially coherent phase modulated signal in a manner which, to a first order, is independent of the signal pattern and therefore, independent of the signal statistics as well.

In accordance with the invention the received signal is divided into two equal components by means of a hybrid junction. One of the components is delayed relative to the other component a period of time equivalent to less than one time slot. The two components are then coupled to one pair of conjugate branches of a second hybrid junction wherein they are recombined. Depending upon the relative phase of the two signal components, an output signal is obtained in either, or in both branches of the second pair of conjugate branches of the second hybrid junction. Each of the output signals thus obtained is amplitude detected in a pair of oppositely-poled detectors, and the two detected signals combined in a common load.

The output developed across the common load has a waveform whose amplitude varies at the signal bit rate.

2

Accordingly, it contains timing information and can be used, for example, to phase-lock a timing oscillator.

Constraints on the recovery system, and an optimum adjustment are described whereby the amplitude of the recovered timing waveform is essentially independent of the information content of the signal.

These and other objects and advantages, the nature of the present invention, and its various features, will appear more fully upon consideration of the various illustrative embodiments now to be described in detail in connection with the accompanying drawings, in which:

FIG. 1 shows, in block diagram, a timing recovery circuit in accordance with the invention;

FIG. 2, included for purposes of explanation, shows the typical output waveform obtained from the circuit of FIG. 1;

FIG. 3, included for purposes of explanation, shows the amplitude of the timing signal obtained for repeating pulse patterns and changing pulse patterns; and FIG. 4 shows, in block diagram, a combined phase detector and timing recovery circuit.

Referring to the drawings, FIG. 1 shows in block diagram a timing recovery circuit in accordance with the invention. Typically, the circuit includes a pair of similar hybrid junctions 10 and 11, a pair of interconnecting wavepaths 12 and 13 of unequal electric lengths, and amplitude detectors 14 and 15. Also shown are two high-pass filters and two low-pass filters for confining the high frequency and low frequency signal components within appropriate portions of the circuit.

Each of the hybrids 10 and 11 has two pair of conjugate branches. The pair of conjugate branches associated with hybrid 10 are designated 1–2 and 3–4. Those associated with hybrid 11 are designated 1′–2′ and 3′–4′.

In the embodiment illustrated in FIG. 1, branch 1 of hybrid 10 is the input branch to which a PCM signal source 9, representing the received signal, is applied. Branch 2 is resistively terminated. Branches 3 and 4 of hybrid 10 are connected to branches 3′ and 4′ of hybrid 11 by means of wavepaths 12 and 13, respectively. In addition, one of the wavepaths 13 includes delay means 17 for introducing a relative time delay $\tau$, between the signal components propagating along the two wavepaths 12 and 13. The delay can be produced by means of a delay network or, where feasible, the two wavepaths can simply be unequal in length.

The remaining branches 1′ and 2′ of hybrid 11 are connected, through high-pass filters to oppositely-poled amplitude detectors 14 and 15. In this embodiment branch 1′ is connected to the anode of a diode in detector 15, designated the "−detector," whereas branch 2′ is connected to the cathode of a diode in detector 14, designated the "+ detector." The other electrode of each diode is connected to a common junction which, in FIG. 1, is designated as ground.

The timing signal is obtained by connecting the two detectors to a common load resistor 16 through a pair of low-pass filters. For purposes of illustration resistor 16 is shown dotted to represent the equivalent loading produced by either a transmission line, or by the input resistance of the next stage in the timing circuit, and to indicate that a separate resistor may or may not be included at this point in the circuit.

As described in the above-identified copending application by W. D. Warters, the received signal consists of a time-sequence of frequency modulated alternating current pulses of uniform amplitude. It is the function of the circuit illustrated in FIG. 1 to divide the signal into two equal components and then to compare these two components after one had been delayed a fraction of a time slot relative to the other component. Thus, in operation, the signal in the $n$th time slot, upon arriving at hybrid 10 by way of branch 1, is divided into two equal components. One component propagates along wavepath 12, the other along wavepath 13. Similarly, the signal in the $n+1^{th}$ time slot, arriving at hybrid 10, is also divided into two equal components, one of which propagates along path 12. However, because of the added delay $\tau$ in path 13, the signal in the $n+1^{th}$ time slot in path 12 arrives at branch 3′ of hybrid 11 before the delayed component of the signal in the $n$th time slot, arriving at branch 4′, has had a chance to clear hybrid 11. Thus, there is a partial overlapping of the signals in adjacent time slots. The extent of this overlapping depends on the ratio $\tau/T$, where T is the time-equivalent of one time slot.

Similarly, there is a partial overlapping of the signal in the $n+1^{th}$ and $n+2^{nd}$ time slots, and all subsequent signals in adjacent time slots. Depending upon the relative phase of the two overlapping signal components, an output signal is obtained in either or both output branches 1′ and 2′ of hybrid 11. These output signals are amplitude detected in detectors 14 and 15, and the detected signals combined in the common load represented by load resistor 16.

It can be shown mathematically, and has been experimentally demonstrated that the typical output waveform developed across load resistor 16 is as illustrated in FIG. 2. Typically, it is a varying waveform, sinusoidal in character, having a fundamental frequency equal to the pulse repetition rate $(=1/T)$ of the signal. As such it provides timing information and can be used as a timing signal at the receiver. However, it can also be shown mathematically, and demonstrated experimentally, that the amplitude of the timing signal thus obtained varies as a function of the information content of the signal, as reflected in the phase change produced during successive time slots. For example, as indicated hereinabove, the signal frequency deviates above or below a reference frequency $\omega_0$ during each pulse interval. This has the effect of advancing or retarding the phase of the signal during each time slot. Typically, the frequency deviation is such as to produce a phase shift of either $+\pi/2$ or $-\pi/2$ radians per time slot. Consequently, four pulse patterns are possible, as illustrated in the following tabulation.

| Pulse pattern designation | Phase shift in $n^{th}$ time slot | Phase shift in $n+1^{t}$ time slo |
|---|---|---|
| 1 | $+\pi/2$ | $-\pi/2$ |
| 2 | $-\pi/2$ | $+\pi2$ |
| 3 | $+\pi/2$ | $+\pi2$ |
| 4 | $-\pi/2$ | $-\pi/2$ |

In the first of the pulse patterns tabulated above, a $+\pi/2$ phase shift is followed by a $-\pi/2$ phase shift. In the second pulse pattern, a $-\pi/2$ shift is followed by a $+\pi/2$ shift. Pattern 3 consists of a $+\pi/2$ phase shift followed by a second $+\pi/2$ phase shift, whereas pattern 4 consists of a $-\pi/2$ phase shift followed by a second $-\pi/2$ phase shift.

In general, the amplitude of the timing signal produced by each of these pulse patterns is different. In addition, each varies as a function of the delay $\tau$. However, since the pulse pattern is always changing, one can arbitrarily select any delay $\tau$ greater than zero but less than one time slot, and generally generate a timing signal. However, it is advantageous to place certain simple restrictions upon the circuit parameters and, thereby, insure an adequate level of timing information that is essentially independent of the pulse pattern. The nature of these restrictions can be obtained from an examination of the mathematical relationships governing the operation of the timing recovery circuit, or from an examination of experimentally obtained data. In particular, it is found that when $$\omega_0\tau = m\pi$$

where:

$\tau$ is the delay,
$\omega_0$ is the undeviated signal frequency, and
$m$ is any integer greater than zero, the timing signals obtained for pulse patterns 1 and 2 are equal, and the timing signals obtained for pulse patterns 3 and 4 are equal. Thus, by satisfying this relationship, the number of possible different timing signals that can be obtained, as a function of the nature of the pulse pattern, are reduced from four to two. It will be noted that of these two, the first timing signal is produced by pulse patterns characterized by a change in phase shift in adjacent slots, or a changing pulse pattern. The other timing signal is produced by pulse patterns characterized by the same phase shifts in adjacent slots, or a repeating pulse pattern.

An examination of the variation in the amplitude of the timing signal, as a function of the delay, discloses that for $\tau=0$, the timing signal produced for both classes of pulse patterns is zero. As $\tau$ increases, the amplitude of the timing signal produced by a changing pulse pattern continually increases, reaching a maximum at $\tau=T$.

The amplitude of the timing signal produced by a repeating pulse pattern also increases initially as $\tau$ increases. However, a maximum is reached at a value of delay that is less than one time slot. As the delay is increased beyond this value, the timing signal decreases, again reaching zero amplitude at $\tau=T$. These variations in the timing signal, as a function of the ratio $\tau/T$, are illustrated in FIG. 3, wherein curve 30 shows the increasing characteristic of a changing pulse pattern, and curve 31 shows the increasing and then decreasing characteristic of a repeating pulse pattern.

It is quite apparent from curves 30 and 31 that the ratio of $\tau/T$ can be selected from within a range of values. The extent of this range depends upon the operating characteristics of the system, and the degree of reliability required. Advantageously, a ratio near the peak of curve 31 is used. However, a useful range is given approximately by $0.4<\tau/T<0.8$. Beyond this range the amplitude of the timing signal for the repeating pattern tends to get too small for reliable operation where a high order of reliability is desired independent of signal statistics.

In the discussion thus far, the timing recovery circuit has been considered independently of the rest of the circuit. However, the typical phase detector used in an FM-differentially coherent phase modulation receiver (and illustrated in the above-identified copending application by Warters) also imposes limitations upon the undeviated signal frequency, $\omega_0$, and the pulse duration, T, given by $$\omega_0 T=\left(n+\frac{1}{2}\right)\pi \quad (2)$$

where $n$ is any integer.

By combining Equation 1 and 2, the following relationship between $\tau$ and T is obtained $$\frac{\tau}{T}=\frac{m}{\left(n+\frac{1}{2}\right)} \quad (3)$$

where $m$ and $n$ are integers.

As an example, when $n=8$ we obtain, from Equation 3, $$\frac{\tau}{T}=\frac{2m}{17}=\frac{2}{17}, \frac{4}{17}, \frac{6}{17}, \frac{8}{17}, \frac{10}{17} \ldots \frac{16}{17} \ldots$$

From curve 3, one would select, as an optimum value for $\tau/T$, a value nearest 0.6, or $10/17=0.588$.

FIG. 4 shows, in block diagram, a composite circuit combining both a typical phase detector used in an FM-DPM receiver, and a timing recovery circuit in accordance with the invention. Basically, each of these two circuits includes two interconnected 3 db hybrid junctions, and means for delaying the signal in one of the two interconnecting paths relative to the signal in the other of these paths.

In the arrangement of FIG. 4, the phase detector portion of the circuit comprises an input hybrid junction 40, an output hybrid junction 50 (and associated filters and detectors), and two interconnecting wavepaths 41 and 42. The timing recovery circuit portion of the circuit comprises the input hybrid junction 40 (which is, thus, shared in common by the two circuits), an output hybrid junction 51, (and associated filters and detectors), and portions of the interconnecting wavepaths 41 and 42.

Since the delay required for the two circuits is different, the delay network which is located in wavepath 42, is advantageously divided into two parts 43 and 44. The first part 43 introduces a delay $\tau$ for the timing circuit. The second part introduces an additional delay $T-\tau$, such that the sum of the two delays is equal to T, as required by the phase detector.

In operation, an input signal, coupled into input hybrid 40 is divided into two equal components. One component propagates along path 41, the other along path 42 where it experiences an initial delay $\tau$. A portion of the signal in path 41 and a portion of the delayed signal in path 42 are coupled, by means of couplers 45 and 46, into hybrid 51. The remaining portion of the signal in path 42 experiences a further delay $T-\tau$, after which it, and the portion of signal remaining in path 41 are coupled into hybrid 50. Timing recovery is accomplished in the manner explained hereinabove. Phase detection occurs in the manner explained by Warters in his copending application.

The timing signal can be used in any one of several ways. For example, in FIG. 4 it is used to phase-lock a timing oscillator 60. The output from the timing oscillator is coupled to a pulse regenerator 61, along with the detector signal output to regenerate the original baseband signal.

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination:

a pulse code modulated signal source whose output signal comprises at time-sequence of alternating current pulses occupying successive time slots wherein the frequency of the alternating current in each of said pulses deviates either above or below a reference frequency;

a circuit for recovering timing information from said signal;

and means for coupling said signal source to said circuit;

characterized in that:

said circuit comprises a first hybird junction for dividing said couple signal into two equal components for propagation along two different wavepaths whose electrical lengths differ by an amount such that one of said components is delayed relative to the other of said components a period of time equivalent to less than one time slot;

a second hybrid junction for combining the signal components in said two wavepaths;

means for coupling the respective output signals from said second hybrid junction to a pair of oppositely-poled amplitude detectors;

and means for combining the detected signals derived from said detectors in a common load.

2. The combination according to claim 1 including a timing oscillator, and wherein said combined detected signals are used to phase-lock said timing oscillator.

3. A method of recovering timing information from a pulse code modulated signal comprising a time-sequence of alternating current pulses occupying successive time slots wherein the frequency of the alternating current in each of said pulses deviates either above or below a reference frequency, comprising the steps of:

dividing said signal into two equal components;

causing said signals to propagate along two different wavepaths whose electrical lengths are such that the component in one of said wavepaths is delayed relative to the component in the other of said wavepaths a period of time less than one time slot;

dividing each of said components into two equal portions;

adding one portion of one component to one portion of the other of said components to form a sum signal;

subtracting the other portion of said one component from the other portion of said other component to form a difference signal;

rectifying each of said sum and difference signals by means of oppositely-poled rectifiers;

and combining said rectified sum and difference signals in a common output load.

4. The circuit according to claim 1 wherein $$\tau\omega_0\tau = m\pi$$

where:

$\omega_0$ is said reference frequency, $\tau$ is the delay, and $m$ is an integer greater than zero.

5. The circuit according to claim 1 wherein $$\frac{\tau}{T} = \frac{m}{\left(n+\frac{1}{2}\right)}$$

where:

$\tau$ is said delay,

T is the duration of one pulse time slot, and $n$ and $m$ are integers greater than zero.

6. A combination phase detector and timing recovery circuit for use with a pulse encoded signal comprising a time-sequence of alternating current pulses occupying successive time slots wherein the frequency of the alternating current in each of said pulses deviates above or below a reference frequency;

said circuit comprising three similar 3 db hybrid junctions each having two pairs of conjugate branches;

one branch of one pair of conjugate branches of one of said hybrids being the signal input branch;

the other branch of said one pair of conjugate branches being resistively terminated;

a pair of wavepaths connecting the other pair of conjugate branches of said one hybrid to one pair of conjugate branches of a second of said hybrids;

delay means included in one of said wavepaths for introducing an additional delay to wave energy propagating therethrough equivalent to one time slot, T, relative to wave energy propagating through the other of said wavepaths;

said delay means being divided into two parts, the first of which introduces a delay $\tau$, the second of which introduces a delay $T-\tau$;

a first pair of oppositely-poled amplitude detectors coupled to the other branches, respectively, of said second hybrid;

means for combining the detected signals from said first pair of detectors in a first common load for deriving a phase detected signal;

first coupling means located between the two parts of said delay means for coupling wave energy between said one wavepath and one branch of one pair of conjugate branches of the third hybrid;

second coupling means for coupling wave energy between said other wavepath and the other branch of said one pair of conjugate branches of said third hybrid;

a second pair of oppositely-poled amplitude detectors coupled to the other branches, respectively, of said third hybrid;

and means for combining the detected signals from said second pair of detectors in a second common load for deriving a timing signal.

References Cited

UNITED STATES PATENTS

| | | | |
|---|---|---|---|
| 2,928,940 | 3/1960 | Ruthroff | 329—116 |
| 3,077,564 | 2/1963 | Forrer. | |
| 3,244,986 | 4/1966 | Rumble. | |

ALFRED L. BRODY, Primary Examiner

U.S. Cl. X.R.

328—109; 325—445; 329—116, 145, 160